United States Patent
Sokoll

(10) Patent No.: US 8,016,720 B2
(45) Date of Patent: Sep. 13, 2011

(54) HOLD FUNCTION FOR TEMPORARILY HOLDING AN OPERATIONALLY READY MOTOR VEHICLE IN A STATIONARY STATE

(75) Inventor: Guenther Sokoll, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/909,309

(22) Filed: Oct. 21, 2010

(65) Prior Publication Data

US 2011/0039658 A1 Feb. 17, 2011

Related U.S. Application Data

(63) Continuation of application No. PCT/EP2009/002609, filed on Apr. 8, 2009.

(30) Foreign Application Priority Data

Apr. 25, 2008 (DE) .................. 10 2008 020 844

(51) Int. Cl.
*B60T 17/00* (2006.01)
*B60T 7/12* (2006.01)
*B60T 11/10* (2006.01)

(52) U.S. Cl. ................... 477/95; 701/70; 701/78; 303/1

(58) Field of Classification Search .................. 477/195; 701/70, 77–80; 303/1
See application file for complete search history.

(56) References Cited

U.S. PATENT DOCUMENTS

| 3,763,975 | A | * | 10/1973 | Fontaine ....................... 477/186 |
| 3,895,698 | A | * | 7/1975 | Fontaine ....................... 477/196 |
| 4,892,014 | A | | 1/1990 | Morell et al. |
| 5,670,831 | A | | 9/1997 | Georgiades |
| 5,984,429 | A | | 11/1999 | Nell et al. |
| 6,315,372 | B1 | * | 11/2001 | Kroger et al. .................. 303/191 |
| 6,439,675 | B1 | | 8/2002 | Zechmann et al. |
| 6,758,298 | B2 | * | 7/2004 | Eberling et al. .............. 180/272 |
| 6,878,096 | B1 | | 4/2005 | Winner et al. |
| 7,690,735 | B2 | * | 4/2010 | Bennett ......................... 303/9.66 |
| 7,734,403 | B2 | * | 6/2010 | Baijens et al. .................. 701/70 |
| 2008/0215224 | A1 | | 9/2008 | Tschernoster et al. |
| 2009/0160245 | A1 | * | 6/2009 | Accardi ........................... 303/3 |

(Continued)

FOREIGN PATENT DOCUMENTS

DE 196 11 360 A1 9/1997

(Continued)

OTHER PUBLICATIONS

Translation of JP08128260A Feb. 11, 2011.*

(Continued)

*Primary Examiner* — Tisha D Lewis
(74) *Attorney, Agent, or Firm* — Crowell & Moring LLP

(57) ABSTRACT

A method is provided for operating a hold function for temporarily holding an operationally ready motor vehicle in a stationary state by use of a service brake. The service brake is actuated by electrohydraulic, electropneumatic or electromechanical mechanisms. The service brake can be activated within the framework of the hold function, when the speed of the vehicle is less than a preset first speed threshold, and the presence of the driver in the driver's seat is detected. The presence of the driver in the driver's seat is detected as a function of the signal of a flap sensor for detecting an opened or closed position of the flap, assigned to this flap sensor.

13 Claims, 2 Drawing Sheets

U.S. PATENT DOCUMENTS

2009/0305848 A1    12/2009    Straub et al.

FOREIGN PATENT DOCUMENTS

| | | | |
|---|---|---|---|
| DE | 198 38 885 | A1 | 3/2000 |
| DE | 198 48 448 | A1 | 5/2000 |
| DE | 199 08 062 | A1 | 8/2000 |
| DE | 199 50 034 | A1 | 4/2001 |
| DE | 102 11 461 | C1 | 7/2003 |
| DE | 102 38 870 | A1 | 3/2004 |
| DE | 103 57 121 | A1 | 7/2005 |
| DE | 10 2005 024 834 | B3 | 1/2007 |
| DE | 10 2005 036 217 | A1 | 2/2007 |
| JP | 08128260 | A * | 5/1996 |
| WO | WO 2005090134 | A1 * | 9/2005 |
| WO | WO 2006128651 | A1 * | 12/2006 |

OTHER PUBLICATIONS

German Search Report dated Sep. 1, 2008, including partial English-language translation (nine (9) pages).

International Search Report dated Jul. 22, 2009, including English-language translation (six (6) pages).

"Betriebsanleitung zum Fahrzeug", BMW, Online Version fuer Sach-Nr. 01 40 2 600 565—Feb. 2008 BMW AG (eight (8) pages).

* cited by examiner

HOLD FUNCTION FOR TEMPORARILY HOLDING AN OPERATIONALLY READY MOTOR VEHICLE IN A STATIONARY STATE

CROSS-REFERENCE TO RELATED APPLICATIONS

This application is a continuation of PCT International Application No. PCT/EP2009/002609, filed Apr. 8, 2009, which claims priority under 35 U.S.C. §119 from German Patent Application No. DE 10 2008 020 844.2, filed Apr. 25, 2008, the entire disclosures of which are herein expressly incorporated by reference.

BACKGROUND AND SUMMARY OF THE INVENTION

The invention relates to a hold function for temporarily holding an operationally ready motor vehicle in a stationary state by means of a service brake, which is actuated by electrohydraulic, electropneumatic or electromechanical means.

For enhanced comfort and increased safety of vehicles, there already exist a wide variety of methods and devices that are intended for preventing an operationally ready motor vehicle from starting to roll, but not necessarily for use on slopes. In at least one operating mode of the motor vehicle in the case of an activated brake pedal or an additional operator control element, which is provided for this purpose, the braking force is usually held or actively built-up at least at one wheel of a vehicle. This braking force can also be built up as a function of the degree to which the brake pedal or operator control element is activated.

Such functions and the corresponding devices are known, for example, under the names start-up assistant, hill assistant, hill hold(er), automatic hold or within the framework of speed control systems having an intervehicle spacing function as far as a state of immobilization, all of which are referred to hereinafter in general as the parking brake functions for temporarily holding an operationally ready motor vehicle in a stationary state. These systems that prevent the operationally ready motor vehicle from starting to roll are configured, for example, as (electro) hydraulic or as (electro) pneumatic or optionally also as electromechanical brake systems that can be electronically controlled and which manage to temporarily hold the operationally ready vehicle and to prevent the vehicle from starting to roll.

There also exist methods, in which the vehicle is prevented from starting to roll by means of the transmission (in particular, an automatic transmission).

In addition to these parking brake functions for temporarily holding an operationally ready motor vehicle in a stationary state by way of a service brake that is actuated electrohydraulically, electropneumatically or electromechanically, there also exist (electro) mechanical hold functions, which are intended to permanently hold the vehicle, which is typically parked, in an immobilized state. In this case the brake pressure or rather the braking force (braking torque) for permanently holding the vehicle is maintained by a mechanical device on the hand brake, more particularly, the parking brake. One example of such a hold function or device is, for example, an electromechanical parking brake. Such hold functions, which maintain the brake pressure by a mechanical device in order to permanently hold the vehicle in a stationary state, are not subsumed under the subject matter of the invention.

In order to activate and deactivate the service brake within the framework of the aforementioned electrohydraulic, electropneumatic or electromechanical parking brake functions for temporarily holding an operationally ready motor vehicle in a stationary state, there are a wide range of triggering conditions and/or conditions that must be fulfilled. The requisite auxiliary measures—control signals or switching elements—for representing and/or executing the parking brake functions are, for example, usually one or more speed signals for detecting the stationary state of the vehicle and (electro) pneumatic or (electro) hydraulic actuators in the wheel brakes and/or in the feed lines to the wheel brakes, by which the braking effect can be increased, decreased, and/or can be held temporarily. Optionally, the signals of longitudinal acceleration or inclination sensors, by which the longitudinal inclination of the roadway is determined, and from which the necessary braking force for a guaranteed immobilization of the vehicle and the startup torque, which is necessary for the roadway inclination, can be determined.

Moreover, there may be one or more pressure sensors, by which the brake pressure or rather the generated brake torque at the wheel brake(s) can be determined.

In order to prevent the service brake from being activated within the framework of an above defined parking brake function for temporarily holding the operationally ready motor vehicle in a stationary state, when the vehicle is unsecured, that is, the driver is not sitting in the vehicle, the presence of the driver must be detected and evaluated. Hence, the current BMW X5 vehicles are equipped with a device for detecting the seat occupancy in the form of a seat occupancy mat, by which the presence and/or absence of the driver in the driver's seat can be determined. The parking brake function (automatic hold) for holding the operationally ready motor vehicle by use of the service brake is rendered operationally ready (that is, can be activated or is already activated), if the driver's seat is occupied. This parking brake function is automatically deactivated (if it was already activated beforehand), when no one is detected in the driver's seat while the engine is running. In contrast to this parking brake function for temporarily holding the operationally ready vehicle, the activated electromechanical parking brake for permanently holding the vehicle remains activated, even if the driver has left the vehicle.

Furthermore, DE 10 2005 024 834 B3 also discloses a parking brake function for temporarily holding an operationally ready motor vehicle by use of the service brake. In this case, the driver's presence is detected and evaluated for the purpose of automatically activating the service brake. The driver's presence is determined by use of interior cameras, weight sensors and/or sensors that detect the buckling up of the driver's seat belt. Such engineering measures for detecting the driver's presence can be very expensive under some circumstances. Moreover, the detection of the driver's presence by way of a seat mat can be very slow in part, so that there may be some delay in the detection of the driver's presence and/or absence.

The object of the invention is to provide a parking brake function that is intended for temporarily holding an operationally ready motor vehicle in a stationary state and that detects the driver's presence in the driver's seat in a simple and cost effective manner, and yet guarantees the necessary safety.

This and other objects are achieved by a hold function method for temporarily holding an operationally ready motor vehicle in a stationary state by use of a service brake, which is actuated electrohydraulically, electropneumatically, or electromechanically, wherein the service brake can be activated within the framework of the hold function, when the speed of the vehicle is less than a preset first speed threshold, and the presence of the driver in the driver's seat is detected. The presence of the driver in the driver's seat is detected as a function of the signal of a flap sensor for detecting an opened or closed position of the flap, assigned to the flap sensor.

It is well known from the prior art that within the framework of the aforementioned parking brake functions for temporarily holding an operationally ready motor vehicle in a stationary state, the service brake in operationally ready motor vehicles can be manually or automatically activated while the motor vehicle is at a standstill, if the speed of the motor vehicle is below a preset first speed threshold (that is, the stationary state of the vehicle is detected) and the presence of the driver in the driver's seat is detected. Then a motor vehicle is operationally ready, if, for example, the communications bus system(s) in the vehicle is (are) in operation and/or if at least the ignition is on or the drive unit has been started. The drive unit may be any drive unit, such as an internal combustion engine or an electric motor. The parking brake function may be herein, for example, a start-up assistant, an automatic hold function or a parking brake function within the framework of a speed control system, which is regulated as far as into a stationary state.

At this point the fundamental idea of the invention is to detect the driver's presence with an alternative sensor unit, which is cost effective and responds quickly. Working on this basis, the method according to the invention is characterized by the fact that the presence of the driver in the driver's seat is detected as a function of the signal of a flap sensor for sensing an opened or closed position of the flap that is assigned to the flap sensor. The term "flap" is defined as all flaps that no longer separate the interior of the vehicle from the exterior of the vehicle when the flaps are in the opened position. Thus, this term includes all doors, windows and optionally sun roofs and tailgates. Within the scope of this invention the actuators, which are used for automatically holding the vehicle, when the drive unit and/or the ignition is (are) switched on, include predominantly those actuators that can be actuated by (electro) hydraulic and/or (electro) pneumatic and optionally also (electro) mechanical means and that effect a temporary automatic hold of the service brake while the motor vehicle is running.

In the simplest embodiment of the invention, the presence of the driver in the driver's seat is detected as a function of the signal of the driver's door flap sensor. As an alternative and/or in addition, it is also possible to evaluate other flap sensor signals, because under some circumstances there is the possibility of the driver leaving the vehicle not through the driver's door (because, for example, the locking mechanism is defective or there is no space to open the door), but rather leaving the vehicle through a different vehicle aperture, such as the passenger door, a window or the tailgate.

In order to detect the driver's presence in the driver's seat, the signal of the corresponding flap sensor is evaluated to the effect that the driver's presence in the driver's seat is detected, when the flap sensor, in particular, the driver's door flap sensor, detects a closed position of the flap. Analogous to the aforesaid, the driver's absence can be detected, when the flap sensor detects an unclosed or rather an opened position of the corresponding flap.

The flap sensor can be configured as the door contact switch, which can differentiate between an open or a closed position of the flap. For example, it is also possible to use for safety reasons, instead of a simple door contact switch, an "intrinsically safer" redundancy door contact switch, that is, a door contact switch that can be monitored and/or diagnosed.

As an alternative, the detected driver's presence can be guaranteed by including redundant and/or semi-redundant information about the driver's presence. In addition, the signal from a switch of the driver's seat belt buckle can be evaluated. The activation of the service brake on the basis of the parking brake function would be possible only if both the flap sensor signal and the signal from the switch of the driver's seat belt buckle indicated the presence of the driver in the driver's seat, that is, if a locked driver's seat belt were to be detected.

In another advantageous embodiment of the invention, the presence of the driver can also be detected when a locked driver's seat belt is detected when in a stationary state (that is, at a speed that is less than the preset first speed threshold) the flap is in an open position, detected by the flap sensor, and when advantageously the flap, which is open in the stationary state, was previously closed.

In order to rule out the possibility that the driver has opened a monitored flap for just a short period of time, an advantageous embodiment of the invention provides that the service brake can be activated within the framework of the aforementioned parking brake functions for temporarily holding an operationally ready motor vehicle, only if at least one flap sensor detects a closed position of the flap, assigned to this flap sensor, for a predefined first time interval, for example, of 0.5 seconds.

Similarly, an additional advantageous embodiment of the invention provides that the service brake, which is activated on the basis of the parking brake function, would have to be deactivated manually, only if once again at least one flap sensor detects a closed flap of the flap, assigned to this flap sensor, for a predefined second time interval, for example, of 1.0 seconds.

Advantageously even more conditions have to be satisfied before the parking brake function and/or the service brake, which is to be activated within the framework of the parking brake function, can be activated (automatically). Thus, it is logical, for example, to activate the service brake within the framework of the respective parking brake function only if in addition to the point-in-time of the potential activation, no risk of the vehicle slipping, turning or overturning is detected or expected.

In order to guarantee that the service brake is and/or can be activated only if the driver is sitting in the vehicle and can intervene, if desired, in the control of the vehicle, the driver's presence in the driver's seat even during the time, in which the service brake, which is temporarily activated based on a hold function, must be monitored and evaluated. In this case, too, the driver's presence can be determined as a function of the signal of a corresponding flap sensor for detecting an opened and/or closed position of the flap. Consequently one advantageous embodiment of the invention provides that the service brake, which is activated temporarily on the basis of the parking brake function, can be automatically deactivated again, if the flap sensor for detecting a closed or opened position of the flap, assigned to this flap sensor, detects an open position of the flap, and/or if an existing seat belt sensor at the driver's seat detects an open position of the driver's seat belt. In one advantageous embodiment only the position of the driver's door is monitored.

However, it is also possible to monitor the other flaps, such as the passenger door, the doors in the rear region of the motor vehicle, the windows and/or the tailgate, because the driver could also leave the vehicle through one of the other flap apertures.

Since it can happen that the driver opens the driver's door for just a short period of time, but does not leave the vehicle, an alternative embodiment provides that in the course of evaluating the signal of the flap sensor the automatically activated service brake cannot be automatically deactivated until the flap sensor for detecting the open and/or closed position of the flap, assigned to this flap sensor, detects an open position of the flap for a predefined first time interval and/or not until a defined speed threshold is undershot. This engineering measure guarantees that the service brake is not already deactivated when the driver opens one of the monitored flaps for just a short period of time.

For safety reasons the activated service brake is advantageously also automatically deactivated independently of the signal of the flap sensor, when the drive unit is switched off and/or when the risk of the vehicle turning, slipping or overturning is detected.

Before the service brake is automatically deactivated because of the detected absence of the driver, for safety reasons the surroundings of the vehicle can also be monitored and evaluated, so that the service brake for temporarily holding the vehicle is not automatically deactivated, when, for example, a person is directly in front of or behind the vehicle. In order to be able to detect and/or expect the presence of a person in front of or behind the vehicle, one advantageous embodiment provides that the position of the engine hood and/or the tailgate or, for example, also the signals of parking sensors, parking cameras or the signals of sensors of automatic speed control systems, etc. can also be evaluated.

If, in addition to an opened vehicle door, in particular the driver's door, and thus, the detected absence of the driver, an open engine hood or an open tailgate or, based on other sensor signals, a person is detected in close proximity of the vehicle, then the deactivation of the service brake may be suppressed. This measure can eliminate the risk of endangering a person located in front of and/or behind the vehicle.

If the automatically activated service brake is automatically deactivated due to the detected absence of the driver or any other hazardous situation, a warning signal can be emitted, so that the driver knows that his vehicle is no longer being held, or will no longer be held in a very short period of time, by the service brake that was activated on the basis of the parking brake function. The warning signal should be designed in such a manner that the driver is aware of the warning, even if he is in the process of leaving the vehicle. The warning is advantageously an acoustic and/or optical warning.

As an alternative or in addition, an alternative device for permanently holding the vehicle, for example, an electromechanical parking brake (parking brake), can also be activated. When the drive unit is switched off, this parking brake usually effects a permanent hold of the vehicle. This measure guarantees that the vehicle will continue to be held in a stationary state, even if the driver has left the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
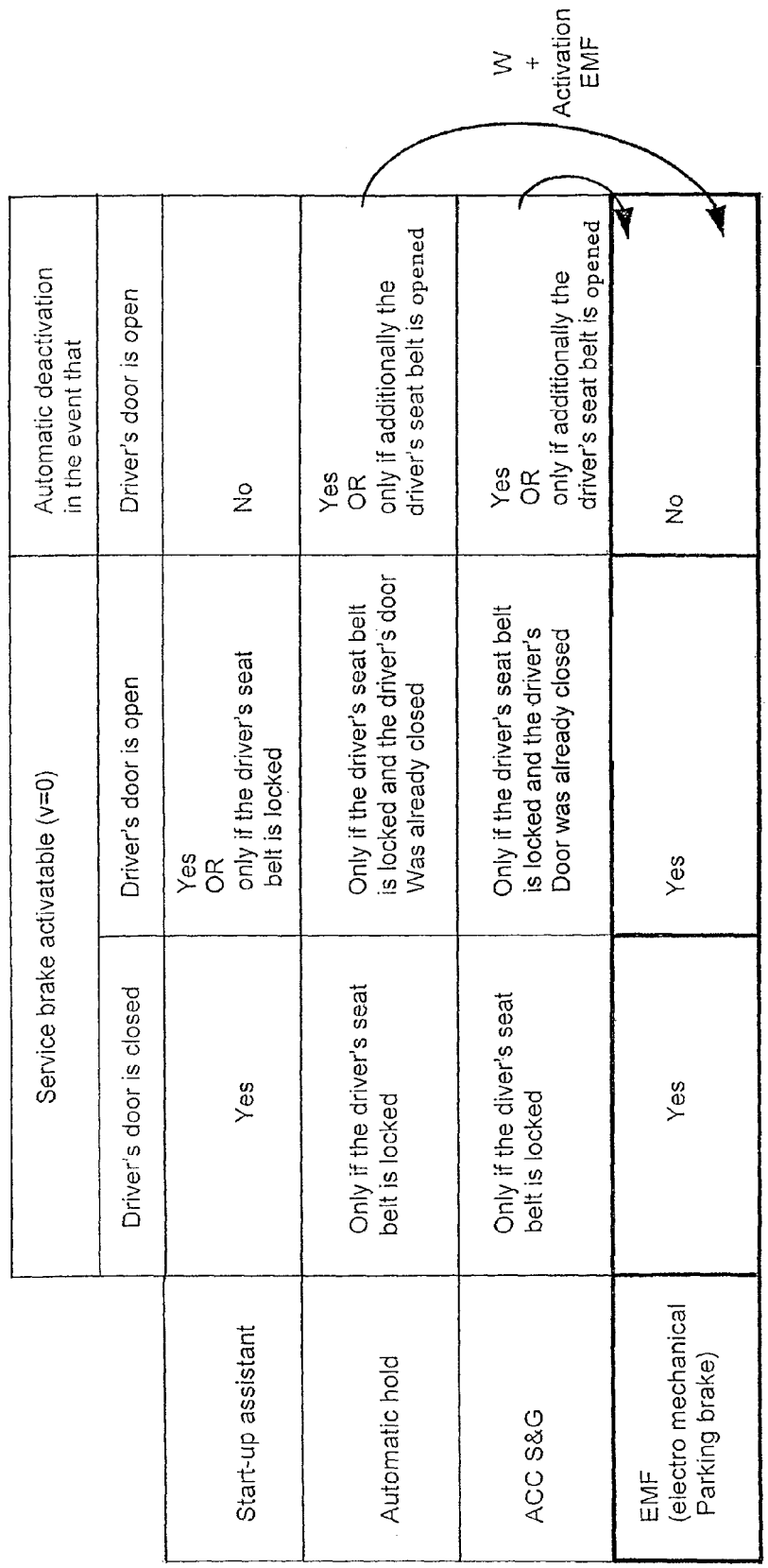
FIG. 1 is a table presenting the various possibilities of evaluating the position of the driver's door with respect to a potential activation and an automatic deactivation of the service brake in conjunction with a variety of parking brake functions.

In FIG. 1, a start-up assistant, an automatic hold function and an ACC S&G (automatic cruise control stop and go) are entered as the parking brake functions for holding an operationally ready motor vehicle in a stationary state. The start-up assistant usually assists the driver when starting on a hill by automatically holding the vehicle in a stationary state when the driver takes his foot off the brake and changes to the gas pedal in order to drive away. In the case of the automatic hold function the vehicle is automatically held through activation of the service brake by manually actuating a push button and/or switch once beforehand in a stationary state or while driving in order to arrive at the standby mode of this automatic hold function at every subsequent, detected standstill of the vehicle until the driver quits a potential automatic drive-away mode by activating an operator control element (for example, a push button, switch, etc.) or the gas pedal with a corresponding build-up of adequate drive torque. In the case of the ACC S&G function, the vehicle, when decelerated to a stationary state within the framework of the speed control system, is held in that state by automatically activating the service brake, until the driver quits a potential automatic drive-away mode by actuating an operator control element or the gas pedal with the corresponding build-up of an adequate drive torque or until an automatic drive-away mode (without quitting) is initiated.

The following shows the type of influence that the position of the driver's door has on the respective capability of temporarily activating the service brake on the basis of the hold function. Thus, when the driver's door is closed, the service brake is always automatically activated within the framework of the start-up assistant, provided that all other requirements have been satisfied.

If the driver's door is open, then an activation of the service brake may be allowed, for example, only if the driver's seat belt is locked or if the driver's door is open for no longer than, for example, 0.5 seconds. In the event that the driver's door is closed, then the service brake can be activated manually within the framework of the automatic hold function, only if additionally the driver's seat belt is locked. If an open vehicle door is detected, then the service brake can be activated by actuating an operator control element, only if the driver's seat belt is locked and if additionally the driver's door was already closed beforehand. The same conditions also apply to the (in this case automatic) temporary activation of the service brake within the framework of the ACC S&G function. In the event that the driver's door is closed, the service brake can be automatically activated within the framework of this parking brake function, only if additionally the driver's seat belt is locked. As an alternative, it may be possible to execute an activation in the event that the driver's door is closed, even independently of the position of the driver's seat belt. If an open vehicle door is detected, then the service brake is temporarily activated within the framework of the parking brake function, only if the driver's seat belt is locked and if additionally the driver's door was already closed beforehand.

In contrast to these parking brake functions for temporarily holding an operationally ready motor vehicle in a stationary state, the hold function EMF (electromechanical parking brake) for permanently holding the vehicle in a stationary state can be activated by activating an electromechanical parking brake independently of the position of the driver's door and, thus, independently of the presence of the driver in the driver's seat (see last line of the table).

The last column of the table of FIG. 1 shows when the service brake, which was temporarily activated on the basis of the aforementioned parking brake functions, will be automatically deactivated as a function of the signal of the driver's door contact switch. Thus, even in the event that the driver's door is open, the service brake, which is activated on the basis of the start-up assistant, is not automatically deactivated, because within the framework of this parking brake function the service brake is typically held only for a very short period of time anyway. This time period is configured in such a manner that the driver cannot leave the vehicle within this time period. However, in contrast to this engineering measure, on detection of an opened driver's door the service brake, which is temporarily activated on the basis of the automatic hold function, can be automatically deactivated either immediately or not until additionally an open driver's seat belt is detected. If the service brake is deactivated, then at the same time and/or immediately before or after the automatic deactivation of the service brake, a warning signal W for warning the driver is generated and outputted, and the electromechanical parking brake EMF is activated, so that the vehicle continues to be safeguarded. The same applies to the service brake that is activated on the basis of the ACC S&G and that temporarily holds the vehicle in a stationary state. In this case the automatically activated service brake is also automatically deactivated if an open driver's door and optionally an open driver's seat belt are detected. If the service brake is deactivated, then at the same time and/or immediately before or after the automatic deactivation of the service brake, a warning signal W for warning the driver is generated and outputted, and the electromechanical parking brake EMF is activated.

Figure 2:
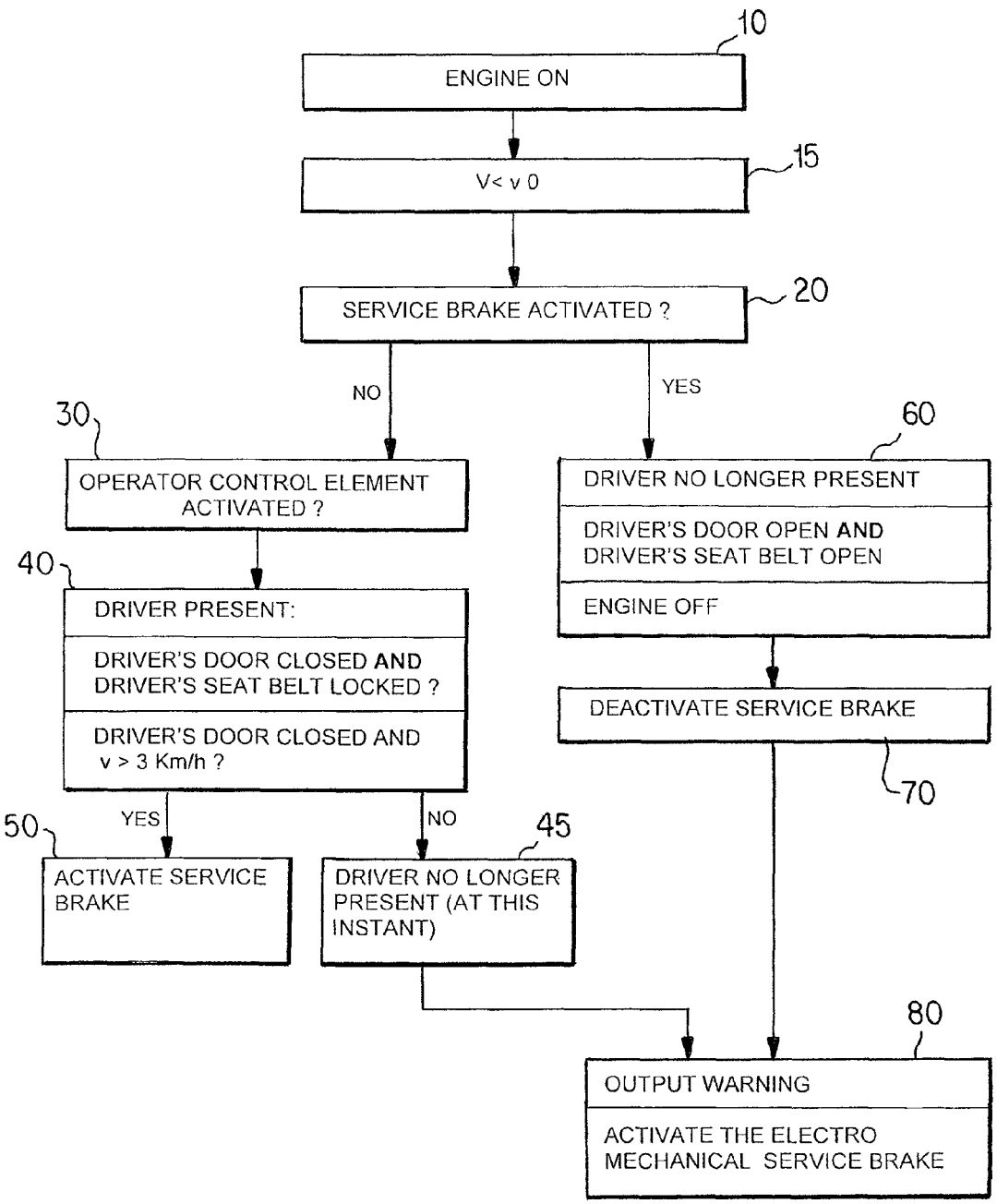
FIG. 2 is a simplified flowchart for automatically activating and deactivating the service brake within the framework of a parking brake function designed as an "automatic hold function".

The following shows by means of the flowchart the type of influence that the position of the driver's door can have on the temporary activation and/or deactivation of the service brake within the function of a parking brake function that is designed as an "automatic hold function". The flowchart depicted in FIG. 2 starts with step 10, as soon as the engine or rather the drive unit is on. The next step 15 checks whether the speed v of the vehicle is less than a preset first speed threshold v0. If this is the case, then the next step 20 checks whether the service brake is already activated on the basis of the automatic hold function.

If the service brake is not activated, then the routine jumps to step 30, which checks whether the operator control element, which can be activated within the framework of the automatic hold function for the purpose of temporarily activating the service brake, is activated. If this is the case, then the routine jumps to step 40, which checks whether the driver is present in the driver's seat. In this embodiment the driver's presence is detected, when the driver's door is closed and the driver's seat belt is locked or when the driver's door is closed and the speed v of the vehicle exceeds a preset first speed threshold v3 (in this case 3 km/h). The position of the driver's door is determined as a function of the signal of a driver's door contact switch, which is closed only if the driver's door is closed. The position of the driver's seat belt is determined as a function of the signal of a seat belt buckle switch, which is also closed only if the driver's seat belt is locked. If the driver's presence in the driver's seat is detected, then the service brake is temporarily activated in step 50.

If in step 40 the driver's presence is not detected, then step 45 checks whether the driver has just left the vehicle, that is, is no longer present at this instant. This check can also be executed, for example, by evaluating the signal of the driver's door contact switch and/or the driver's seat belt buckle switch and optionally the speed of the vehicle. If it is detected that the driver is in the process of leaving the vehicle, then the routine jumps to step 80, where a warning is generated and outputted for the driver. Under certain conditions the hold function of the brakes can be taken over by a different function. For this purpose the activation of an electromechanical parking brake may prove to be useful, because it effects a permanent mechanical hold of a brake.

If step 20 finds that the service brake has already been activated on the basis of the actuation of the corresponding operator control element for automatically holding the vehicle in a stationary state, then the routine jumps to step 60, which checks whether the driver is still present in the driver's seat. That is, it is checked whether the driver has left the driver's seat and/or is in the process of leaving the vehicle. In this embodiment the driver's absence is detected when the driver's door and the driver's seat belt are open or the engine is off. Similarly to the aforesaid, the position of the driver's door is determined once again as a function of the signal of a driver's door contact switch, which is closed only if the driver's door is closed. Similarly the position of the driver's seat belt is determined as a function of the signal of a seat belt buckle switch, which is also closed only if the driver's seat belt is locked. In addition to the position of the driver's door and the seat belt buckle, the speed can also be evaluated in such a way that the driver's absence is detected only if the speed of the vehicle drops below the preset third speed threshold. If the driver's absence is detected, then the service brake, which is temporarily activated on the basis of the hold function, is immediately deactivated in step 70, and step 80 outputs in a manner analogous to the aforesaid a warning to the driver, and/or the electromechanical parking brake is activated in order to continue to permanently hold the vehicle.

The detection of the driver's presence (step 40) or the detection of the driver's absence (step 60) disclosed in this embodiment can also be used for other vehicle functions, for which the detection of the driver's presence is relevant.

At variance with this embodiment, it is possible to detect and evaluate even more flap positions with respect to the detection of the driver's presence and/or absence. Moreover, a deactivation may also be initiated only if in the event of a detected driver's absence neither the engine hood nor the tailgate is open, or no obstacle is sensed in front of and/or behind the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for temporarily holding an operationally ready motor vehicle in a stationary state by use of a service brake, which is actuated electrohydraulically, electropneumatically, or electromechanically, the method comprising the acts of:

activating the service brake within a hold function framework when a speed of the vehicle is less than a preset first speed threshold and a presence of a driver in a driver's seat of the vehicle is detected; and detecting the presence of the driver in the driver's seat as a function of a flap sensor signal indicative of an opened or closed position of a flap assigned to a flap sensor, wherein the presence of the driver in the driver's seat is detected when the flap sensor indicates a closed position of a driver's door and a locked driver's seat belt is detected.

2. The method according to claim 1, wherein the flap sensor detects at least one of an opened and closed position of at least one of the driver's door of the motor vehicle, a passenger door of the motor vehicle, a tailgate of the motor vehicle, a sun roof of the motor vehicle, and a window of the motor vehicle.

3. The method according to claim 1, wherein the presence of the driver in the driver's seat is detected when the flap sensor signal indicates a closed position of the driver's door assigned to the flap sensor.

4. A method for temporarily holding an operationally ready motor vehicle in a stationary state by use of a service brake, which is actuated electrohydraulically, electropneumatically, or electromechanically, the method comprising the acts of:
   activating the service brake within a hold function framework when a speed of the vehicle is less than a preset first speed threshold and a presence of a driver in a driver's seat of the vehicle is detected; and
   detecting the presence of the driver in the driver's seat as a function of a flap sensor signal indicative of an opened or closed position of a flap assigned to a flap sensor, wherein the presence of the driver in the driver's seat is detected when in an event of a detected open position of the flap in the stationary state of the operationally ready motor vehicle, a locked driver's seat belt is detected and the flap, which is open in the stationary state, was previously closed.

5. A method for temporarily holding an operationally ready motor vehicle in a stationary state by use of a service brake, which is actuated electrohydraulically, electropneumatically, or electromechanically, the method comprising the acts of:
   activating the service brake within a hold function framework when a speed of the vehicle is less than a preset first speed threshold and a presence of a driver in a driver's seat of the vehicle is detected; and
   detecting the presence of the driver in the driver's seat as a function of a flap sensor signal indicative of an opened or closed position of a flap assigned to a flap sensor, wherein the presence of the driver in the driver's seat is detected when at least one flap sensor of the motor vehicle detects a closed position of a respectively assigned flap for a predefined first time interval, or when an opened position of the flap in the stationary state of the operationally ready motor vehicle is detected for less than a predefined second time interval.

6. The method according to claim 1, wherein the temporary holding of the operationally ready motor vehicle is activatable only if in addition no risk of at least one of slipping, turning and overturning of the motor vehicle is detected.

7. The method according to claim 1, wherein the service brake, which is activated based on a parking brake function, is automatically deactivated in accordance with at least one of the following conditions:
   the flap sensor for detecting an open and/or closed position of the flap assigned to this flap sensor detects an open position of the flap; and
   a safety belt sensor at a driver's seat detects an open position of the driver's seat belt.

8. The method according to claim 4, wherein the flap sensor detects at least one of an opened and closed position of at least one of a driver's door of the motor vehicle, a passenger door of the motor vehicle, a tailgate of the motor vehicle, a sun roof of the motor vehicle, and a window of the motor vehicle.

9. The method according to claim 4, wherein the temporary holding of the operationally ready motor vehicle is activatable only if in addition no risk of at least one of slipping, turning and overturning of the motor vehicle is detected.

10. The method according to claim 4, wherein the service brake, which is activated based on a parking brake function, is automatically deactivated in accordance with at least one of the following conditions:
    the flap sensor for detecting an open and/or closed position of the flap assigned to this flap sensor detects an open position of the flap; and
    a safety belt sensor at a driver's seat detects an open position of the driver's seat belt.

11. The method according to claim 5, wherein the flap sensor detects at least one of an opened and closed position of at least one of a driver's door of the motor vehicle, a passenger door of the motor vehicle, a tailgate of the motor vehicle, a sun roof of the motor vehicle, and a window of the motor vehicle.

12. The method according to claim 5, wherein the temporary holding of the operationally ready motor vehicle is activatable only if in addition no risk of at least one of slipping, turning and overturning of the motor vehicle is detected.

13. The method according to claim 5, wherein the service brake, which is activated based on a parking brake function, is automatically deactivated in accordance with at least one of the following conditions:
    the flap sensor for detecting an open and/or closed position of the flap assigned to this flap sensor detects an open position of the flap; and
    a safety belt sensor at a driver's seat detects an open position of the driver's safety belt.

* * * * *